US011164113B2

(12) United States Patent
Howard

(10) Patent No.: US 11,164,113 B2
(45) Date of Patent: Nov. 2, 2021

(54) TIME LIMITED IMAGE SHARING

(71) Applicant: Fredrick T Howard, Riverside, CA (US)

(72) Inventor: Fredrick T Howard, Riverside, CA (US)

( * ) Notice: Subject to any disclaimer, the term of this patent is extended or adjusted under 35 U.S.C. 154(b) by 82 days.

(21) Appl. No.: 15/756,494

(22) PCT Filed: Jan. 31, 2017

(86) PCT No.: PCT/US2017/015892
§ 371 (c)(1),
(2) Date: Feb. 28, 2018

(87) PCT Pub. No.: WO2017/136363
PCT Pub. Date: Aug. 10, 2017

(65) Prior Publication Data
US 2019/0005419 A1    Jan. 3, 2019

Related U.S. Application Data

(60) Provisional application No. 62/388,688, filed on Feb. 5, 2016, provisional application No. 62/493,311, filed (Continued)

(51) Int. Cl.
*G06Q 10/00* (2012.01)
*G06Q 10/06* (2012.01)
(Continued)

(52) U.S. Cl.
CPC ........... *G06Q 10/06* (2013.01); *G06F 16/125* (2019.01); *G06F 16/51* (2019.01); *G06F 40/00* (2020.01);
(Continued)

(58) Field of Classification Search
CPC .. G06Q 50/01; G06Q 10/101; G06Q 30/0241; G06Q 30/0277; G06Q 30/0251;
(Continued)

(56) References Cited

U.S. PATENT DOCUMENTS 7,133,900 B1    11/2006 Szeto
7,356,572 B2    4/2008 Jiang et al.
(Continued)

FOREIGN PATENT DOCUMENTS

WO    2014194262 A3    12/2014
WO    2015192026 A1    6/2015
WO    2016007285 A1    1/2016

OTHER PUBLICATIONS

Applicant Admission (from Applicant's admissions in the PG Pub. 2019/0005419).*

(Continued)

*Primary Examiner* — Gabrielle A McCormick
(74) *Attorney, Agent, or Firm* — Chad Peterson

(57) ABSTRACT

This system introduces photo imagery, video imagery, animation imagery, graphic interchange format (GIF) imagery, written content imagery, audio wave imagery, audio file imagery, and streaming media imagery, which is subject to an appearing, disappearing, deletion, and expiring time restriction as set by the sender or system administrator. The system primarily facilitates time restricted appearing content such as selfies, standard photos, video, and audio files where end-users can alter, manipulate or replicate the content against a competing clock for a predetermined period of time while the content is still in a server or electrical storage device prior to going live on a social media website or in a private in-house website forum. In addition, a sender or system administrator may grant preferred end-users pre-release authority to replicate the sender's original content (Continued)

within the server so that it may later be compared against the sender's original content sent to a website display or gallery.

21 Claims, 2 Drawing Sheets

Related U.S. Application Data on Jun. 30, 2016, provisional application No. 62/391,575, filed on May 5, 2016, provisional application No. 62/390,579, filed on Apr. 4, 2016.

(51) Int. Cl.

| | |
|---|---|
| *G06F 16/11* | (2019.01) |
| *G06Q 50/00* | (2012.01) |
| *G06F 16/51* | (2019.01) |
| *G06Q 30/02* | (2012.01) |
| *G06F 40/00* | (2020.01) |
| *H04L 12/58* | (2006.01) |

(52) U.S. Cl.
CPC ......... *G06Q 30/0241* (2013.01); *G06Q 50/01* (2013.01); *H04L 51/00* (2013.01)

(58) Field of Classification Search
CPC .... G06Q 30/0269; G06Q 30/02; G06Q 10/06; H04L 51/32; H04L 67/306; H04L 47/122; H04L 51/00; G06F 40/00; G06F 16/125; G06F 16/51

See application file for complete search history.

(56) References Cited

U.S. PATENT DOCUMENTS

| | | | |
|---|---|---|---|
| 7,729,481 B2 | 6/2010 | Thompson et al. |
| 7,818,397 B2 | 10/2010 | Jiang et al. |
| 8,184,783 B2 | 5/2012 | Thompson et al. |
| 8,402,097 B2 | 3/2013 | Szeto |
| 8,428,453 B1 | 4/2013 | Spiegal et al. |
| 8,554,868 B2 | 10/2013 | Skyrm et al. |
| 8,584,017 B2 | 11/2013 | Appelman |
| 8,584,018 B2 | 11/2013 | Appelman |
| 8,627,308 B2 | 1/2014 | Deluca et al. |
| 8,667,397 B2 | 3/2014 | Appelman |
| 8,713,441 B2 | 4/2014 | Appelman |
| 8,775,972 B2 | 7/2014 | Spiegel |
| 8,909,725 B1 | 12/2014 | Sehn |
| 8,914,752 B1 | 12/2014 | Spiegel |
| 9,015,285 B1 | 4/2015 | Ebsen et al. |
| 9,026,943 B1 | 5/2015 | Spiegel |
| 9,083,770 B1 | 7/2015 | Drose et al. |
| 9,094,137 B1 | 7/2015 | Sehn |
| 9,111,164 B1 | 8/2015 | Anderton et al. |
| 9,113,301 B1 | 8/2015 | Spiegel et al. |
| 9,143,681 B1 | 9/2015 | Ebsen et al. |
| 9,148,424 B1 | 9/2015 | Yang |
| 9,225,674 B2 | 12/2015 | Fioretti et al. |
| 9,225,897 B1 | 12/2015 | Sehn |
| 9,237,202 B1 | 1/2016 | Sehn |
| 2004/0215731 A1 | 10/2004 | Tzan-en Szeto |
| 2005/0102351 A1 | 5/2005 | Jiang et al. |
| 2007/0005719 A1 | 1/2007 | Szeto |
| 2007/0100796 A1* | 5/2007 | Wang ............... G06Q 30/02 |
| 2008/0139177 A1 | 6/2008 | Jiang et al. |
| 2008/0168154 A1 | 7/2008 | Skyrm et al. |
| 2008/0189609 A1 | 8/2008 | Larson et al. |
| 2008/0235721 A1 | 9/2008 | Ismail et al. |
| 2009/0244000 A1 | 10/2009 | Thompson et al. |
| 2010/0070580 A1 | 3/2010 | Williams et al. |
| 2010/0114718 A1* | 5/2010 | Cho ............... G06Q 30/0276 |
| | | | 705/14.72 |
| 2011/0197153 A1* | 8/2011 | King ............... G06F 3/04883 |
| | | | 715/769 |
| 2012/0173647 A1 | 7/2012 | Levell et al. |
| 2012/0180083 A1 | 7/2012 | Marcus |
| 2012/0284611 A1 | 11/2012 | Burckart et al. |
| 2013/0124282 A1* | 5/2013 | Hopwood ......... G06Q 30/0245 |
| | | | 705/14.16 |
| 2013/0124658 A1 | 5/2013 | Fioretti et al. |
| 2013/0191466 A1* | 7/2013 | Perlow ............... G06Q 50/01 |
| | | | 709/206 |
| 2013/0283150 A1 | 10/2013 | Chen et al. |
| 2013/0332386 A1* | 12/2013 | Billmaier ............ G06Q 30/02 |
| | | | 705/347 |
| 2014/0038546 A1 | 2/2014 | Neal et al. |
| 2014/0055633 A1 | 2/2014 | Marlin et al. |
| 2014/0089897 A1 | 3/2014 | Deluca et al. |
| 2014/0129953 A1 | 5/2014 | Spiegel |
| 2014/0359024 A1 | 12/2014 | Spiegel |
| 2014/0359032 A1 | 12/2014 | Spiegel et al. |
| 2015/0032832 A1 | 1/2015 | Chen |
| 2015/0081827 A1 | 3/2015 | Bostick et al. |
| 2015/0134143 A1 | 5/2015 | Willenborg |
| 2015/0180813 A1 | 6/2015 | Banks et al. |
| 2015/0195359 A1 | 7/2015 | Chen et al. |
| 2015/0222625 A1 | 8/2015 | Ford et al. |
| 2015/0236995 A1 | 8/2015 | Hammer et al. |
| 2015/0295866 A1 | 10/2015 | Collet et al. |
| 2015/0365795 A1 | 12/2015 | Allen et al. |
| 2016/0006927 A1 | 1/2016 | Sehn |

OTHER PUBLICATIONS

Graeser, Dvorah, Snapchat vs Facebook: Patent Smackdown, Blog dated Dec. 1, 2015.

* cited by examiner

| | |
|---|---|
| 10 | Creation of content |
| 12 | Determining the cut-off time for the content |
| 13 | Mobile system is geolocation-tagged for content communication within the system |
| 15 | Uploading content to the server before public sharing |
| 16 | Creating permission list for limited users to access content |
| 17 | Notifying users of the presence of the content |
| 20 | A rating score may be assigned to content destined for non-interactive foreign sites |
| 22 | User provided an opportunity to comment on the photo while in the server |
| 23 | User may edit photo in the server destined for the system forum |
| 24 | Preferred content is posted in a gallery for display and scoring |
| 25 | Averaging score value and displaying it |
| 35 | Mobile system is geolocation-tagged for content communication within the system |
| 36 | Positive and negative scores fluctuate in forum until the expiration time |
| 40 | Content not preferred is deleted |
| 41 | Lower scored content vanishes to reveal optional advertisements and incentives |

Fig. 2

TIME LIMITED IMAGE SHARING

CROSS-REFERENCE TO RELATED APPLICATION(S)

The present application claims priority to PCT Application PCT/US17/15892 filed on Jan. 31, 2017, now WO 2017136363A1, entitled "Time Limited Image Sharing", the entire disclosure which is incorporated by reference herein. PCT Application PCT/US17/15892 claims priority to U.S. Provisional Patent Application No. 62/390,579 filed on Apr. 4, 2016, entitled "Computer Display Adjustment Process"; U.S. Provisional Patent Application No. 62/391,575 filed on May 5, 2016, entitled "Photo image on video image sharing on advertisement method using a time restriction"; U.S. Provisional Patent Application No. 62/493,311 filed on Jun. 30, 2016, entitled "Computer image advertisement manipulation system using time restrictions"; and U.S. Provisional Patent Application No. 62/388,688 filed on Feb. 5, 2016, entitled "Predetermine a time launched social media photo sharing image and audio alert release client edit approval application process", the entire disclosure of all of which is incorporated by reference herein.

BACKGROUND OF THE INVENTION

1. Field of Invention

The present invention relates to the field of software and apps for image sharing and modification generally through a social network.

2. Description of Related Art

Snapchat was invented in 2011 and involves disappearing photos, videos, and text messages after a short period of time. However, Snapchat does not permit the viewer's social connections to up-vote or down-vote content such as photos, videos, animation, music, or streaming files for the preferential scoring, or rating for elimination by graphic interface format (GIF) content before expiring.

Furthermore, Snapchat does not provide a customization of settings, such as a competing time clock 9 against an end-user to determine how long the content will remain available for user altering, comparing, voting, scoring, or rating before expiring to afford users an option to view and redeem additional content and advertisement incentives.

Instagram involves users posting photos and videos in a website gallery in which people can make comments on and use various filters to change the appearance of the photos. In the present art system, users may also apply filters and image enhancers to improve content quality. However Instagram does not additionally introduce photo, image, video, animation, GIFs, music, or streaming files which automatically appear in a website forum or gallery against a competing clock 9 at a specified time set by a sender or system administrator for the preferential voting, scoring, or rating for the purpose of eliminating undesired or lower scored or rated content to permit the user an opportunity to redeem incentives.

Furthermore, Instagram does not provide a customization of settings, such as a competing time clock 9 against an end-user to determine how long the content will remain available for user comparing, voting, scoring, or rating before expiring, to afford users an option to view additional content and redeem advertisement incentives.

Reddit permits up voting and down-voting of threads, permitting the system to determine the popularity of content. Tinder permits a swiping motion to be used to prefer one image over another, however, several mobile application permit a swiping motion on a mobile display for preferential selection and neither Tinder or Reddit permit the selection of preferential images within a time period after the expiry of which the image is destroyed to afford users an option to compare, view or redeem additional content and advertisement incentives.

Expiring audio and image content subject to a removal time restriction is already known and has been practiced in the prior art. This concept has been around for several years. This process was made popular in the United States with the debut of the television show Mission Impossible, which ran from 1966-1973, in which audio taped messages burned up or exploded after several moments of being listened to, the fundamental purpose being that once the content had been accessed, it would then be permanently destroyed and would never be able to be recovered.

This concept has also evolved over the last several years with the introduction of advanced computers and has expanded to reveal an increasing trend toward the introduction of expiring or disappearing content on computer mobile applications, the most popular being Snapchat.

Because expiring message technology is already included within the public domain, several Snapchat competitors have introduced applications with the same features as Snapchat. Some of these mobile applications include Instagram, Facebook, Blink, Confide, Wickr, Poke, Slingshot, Cyberdust, and several other lesser known applications within a currently crowded market which focuses on content expiring or vanishing shortly after being viewed.

These applications were primarily designed with privacy in mind, the key feature being that the images are not able to be recovered after the designated expiration time, or that recovering the content would be extremely difficult or exhaustive, making such attempts impractical or impossible without the help of one skilled in the art of data recovery in the computer sciences.

The aforementioned applications (prior art) focus on privacy due to limited time viewing after the content appears, however the prior art fails to address the most fundamentally desired aspect of content publically or privately appearing for viewing using a time restriction.

This failure specifically concerns the problem of content which is not desired to be viewed by using an appearing time restriction window instead of a disappearing time restriction window, and whereby an end-user is afforded some manipulative control or influence over unwanted, unflattering, or even embarrassing content from appearing on a social media website or private in-house corporate website forum. In addition, one major problem that has plagued mankind since Joseph Nicephore Niepce invented the first photographic camera in 1827, is the ability for a person to prevent, stop, delay, or alter unwanted or unflattering images from reaching a public or private setting or gallery in the first place.

Specific prior art attempts to provide a solution include U.S. Pat. No. 8,914,752, which has to do with a touch controller technique identifying haptic contact to cause a media to as an ephemeral messages that last only for a short period of time. U.S. Pat. No. 8,909,725 has to do with receiving objects for automatic deletion after a specified period of views, and several apps do this including Cyber Dust. Other examples are US 20140055633 and US 20150109472, which describes an Image capture device that uses timed cameras.

Based on the foregoing, there is a need in the art for a system that permits a user to upload several images to a server, for dissemination publicly after a period of closed viewing and manipulation by selected social media contacts, wherein the social media contacts may express a preference for one image over the plurality thereof, and whereby a system end-user or casual viewer is afforded a redemption incentive for viewing unwanted or inferior scored or rated content subject to a time restriction, thereby introducing the prolonged user engagement, as a new and improved system of advertisement commerce.

SUMMARY OF THE INVENTION

This system introduces photo imagery, video imagery, animation imagery, graphic interchange format imagery (GIF), written content imagery, audio wave imagery, audio file imagery, and streaming media imagery, which is subject to an appearing, disappearing, deletion, and expiring time restriction as set by the sender or system administrator.

The system primarily facilitates time restricted appearing content such as selfies, standard photos, video, and audio files where end-users can alter, manipulate or replicate the content against a competing clock for a predetermined period of time while the content is still in a server or electrical storage device prior to going live on a social media website or in a private in-house website forum.

In addition, a sender or system administrator may grant preferred end-users pre-release authority to replicate the sender's original content within the server so that it may later be compared against the sender's original content sent to a website display or gallery forum for crowed sourced scoring and competitive user incentives Additionally, a sender or system administrator may choose to select a system mode to preserve the sender's original undisturbed copy of the pre-release content within the server, so it may be compared with any replicated or manipulated copies sent to a website display or gallery forum.

For example, in one embodiment, a preferred end-user competing against a thirty minute time clock release may apply an animated mask on a video of a person to compare with the original video so it may later be scored for end-user preference against the original video within a gallery.

In another embodiment, a preferred end-user competing against a five minute time clock release might replicate an original selfie of two girls, by accessing a Photoshop feature to replace the eyes and nose of one of the girls with the eyes and nose of the preferred end-user.

The sender or system administrator may grant or redact permissions of any system user, including a preferred end-user (in-network contact or close friend).

Once the content is posted, end-users can add to or subtract from fluctuating score values in real time on original and altered content until a designated cut off time. The content with the highest averaged score value is considered the best by popular demand and maintains the highest visual percentage displayed on a social media gallery display screen, a portable mobile device display screen, or on a computer assisted television display screen.

This system also introduces a self-destruct content deletion method on content which appears within a website gallery display, a mobile application display, or a computer assisted television display which does not receive a favorable score by end-users upon expiration of a clock.

The content can be programmed to rapidly or slowly self-destruct by disappearing, disintegrating, dissolving, morphing, changing appearance, exploding, animating, filter animating, expiring, receding, evolving, or by replacing the content with graphic interchange format images on an end-users computer display.

As the content changes or disappears, various advertisement banners or links appear revealing products, cash awards, services, discounts, entertainment, or prizes. A sender or system administrator can override which content is selected for the automatic self-destruct deletion method (refer to Embodiment A). In one embodiment, the self-destruct algorithm runs on an ecommerce platform.

In-network contacts (close friend users) and out of network end-users could also score the manipulated content against the original unaltered content for preferential comparisons. Multiple personal contacts and end-users may add a score value several times to an image. When the addition occurs, the alpha or numerical image score or rate value fluctuates higher in real-time. Conversely, multiple personal contacts and end-users may also subtract an image score or rate value several times causing the average image score to decrease to a negative score value or reverse display.

The final score would appear in real time after a designated cut off period which the sender (client initiator) or the automated system selected.

Like Instagram and Pinterest, the website would preferentially be a photo and video image gallery and the selected content would be categorically arranged for end-user viewing and convenience. However, audio image files and streams could also be scored and rated within the system.

The system also permits sharing and content manipulation to a limited degree on non-interactive foreign websites such as Instagram, Twitter, Facebook, and Pinterest. However, any rating or scoring of content to be potentially shared on non-interactive sites, could only take place while the content is still contained within the server due to the incompatibility or non-interactivity of the foreign site. For example, the manipulation within the server may not support activity such as animation without some form of positive integration with the foreign site. In addition, the foreign site may not support end-user scoring or rating of the content if the content is sent to be displayed to a foreign site for comparison, expiring, self-destruction and advertising as introduced in the present art system.

Selected in-network contacts may alter or prevent pre-release content from appearing in a website or on a mobile display, as long as the in-network contacts interfere with the pre-release content before the designated cut-off period within the server as determined by the sender or administrator.

The present art also affords a parent, guardian, public safety official, court, or private security company a means by which to monitor vulnerable, protected, or precluded juveniles, or adults, from public exploitation by potential criminal offenders, particularly child sex offenders who often exploit social media websites in search of children.

Therefore, unlike the prior art, which exploits content which expires or disappears using a time restriction, the present art system does not consider privacy as a fundamental feature of its application after the content is released from a server to a computer display, nor is it the present art system's primary purpose to have content expire after a short viewing period as so practiced in the prior art, but rather, the opposite occurs.

Therefore, the present art application introduces a system whereby content is automatically uploaded into a server after an end-user initiates an image capture event, causing the uploaded content to appear within the server for a specified period of time, for the purpose of manipulating, rating, scoring, or replicating the content in preparation of a content disbursement into the system website or other foreign website.

The specified period of time is determined by the sender or system administrator, however, prior to the content being released from the server into the system image gallery or foreign site, the pre-release content is subject to a countdown or count forward time clock content manipulation race against an authorized end-user.

Prior to or during the race competition period, a sender or system administrator may allocate specific permissions to preferentially selected end-users. The specified permissions permit in-network end-users (close friends) to have superior system interactivity with regard to content manipulation over inferior (out of network) users, to alter, manipulate, rate, animate, comment, corroborate, or request the content not be released. The proposed content to be manipulated may be photo content, video content, music file content, music wave content, streaming media content, graphic interchange format content, or animated file content.

Once the content manipulation period ends within the server (a race against the clock), all special end-user permissions are revoked and the content may no longer be manipulated within the server.

The content is then automatically released to the primary system gallery, its mobile subsystem component (mobile app), or to any selected foreign websites in the state of manipulation that the content was in at the time the clock expired within the server.

After the display period has elapsed, and the content has been viewed and optionally scored by public users (in-network and out of network), the content is then preferentially removed from the system display by using a common viewing expiring period so practiced in the prior art by Snapchat and similar content expiring applications (although usually a much longer time period is set to allow for content comparing, scoring or rating by end-users).

Unlike the prior art inventions, the present art specifically allows for the end-user to have a limited time opportunity to change, enhance, edit, alter, Photoshop, animate, video edit, optionally rate, or score, the content of concern to the end-user before it is released from a standard server, cloud, or electrical storage center to a primary system website image gallery display, subsystem mobile application display, or computer assisted television screen display, for the purpose of end-user comparing against other displayed content which is also preferentially scored or rated against competing content on display.

Unlike in the prior art, the lowest scored or rated content which has been subject to the appearing time restriction and which remains within a display at the end of a designated cut off period, is removed or hidden from the computer display primary system website gallery screen, subsystem mobile gallery screen, or computer facilitated television screen by a more intrusive or disruptive manner than by the simply expiring or vanishing of content (refer to Snapchat and prior art content removal methods), although the present art system may also practice the common removal method of expiring or vanishing content from a computer display as delineated within the prior art.

Unlike in the prior art, the remaining lower rated or scored content is preferentially removed from the devices' display by graphic interchange format replacement, exploding, dissolving, fading, evolving, melting, morphing, misting, or transforming; thereby revealing advertisement content and incentives such as cars, cash, prizes, links, promotions, etc.

Unlike in the prior art, the advertisement content which remains in the primary system website gallery screen, subsystem mobile device screen, or computer assisted television screen is displayed until a specific redemption time has expired. Once this occurs, the advertisement content may be removed in the same manner as the aforementioned content, by graphic interchange format replacement, exploding, expiring, disappearing, dissolving, fading, evolving, melting, morphing, or transforming to reveal additional content or advertisement incentives as determined by a simple program action of the sender or system administrator.

An end-user viewing and controlling the time restricted content system reserves the right to amend the functionality of the display by selecting a system mode or program action to reduce, control, or altogether eliminate undesired advertisement from appearing on the end-users computer display.

Unlike in the prior art, the present art introduces a new and improved method of commerce functionality by introducing a time restricted content appearing method and subsequent time removal method, whereby the system administrator preferentially programs the system core to optionally disconnect or terminate the public from a social media connection to facilitate a private in-house (corporate account) use, for business, government, public safety, or academic institutional use.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

FIG. 2 is a flowchart view of the method, according to an embodiment of the present invention.

DETAILED DESCRIPTION OF PREFERRED EMBODIMENTS

Figure 1:
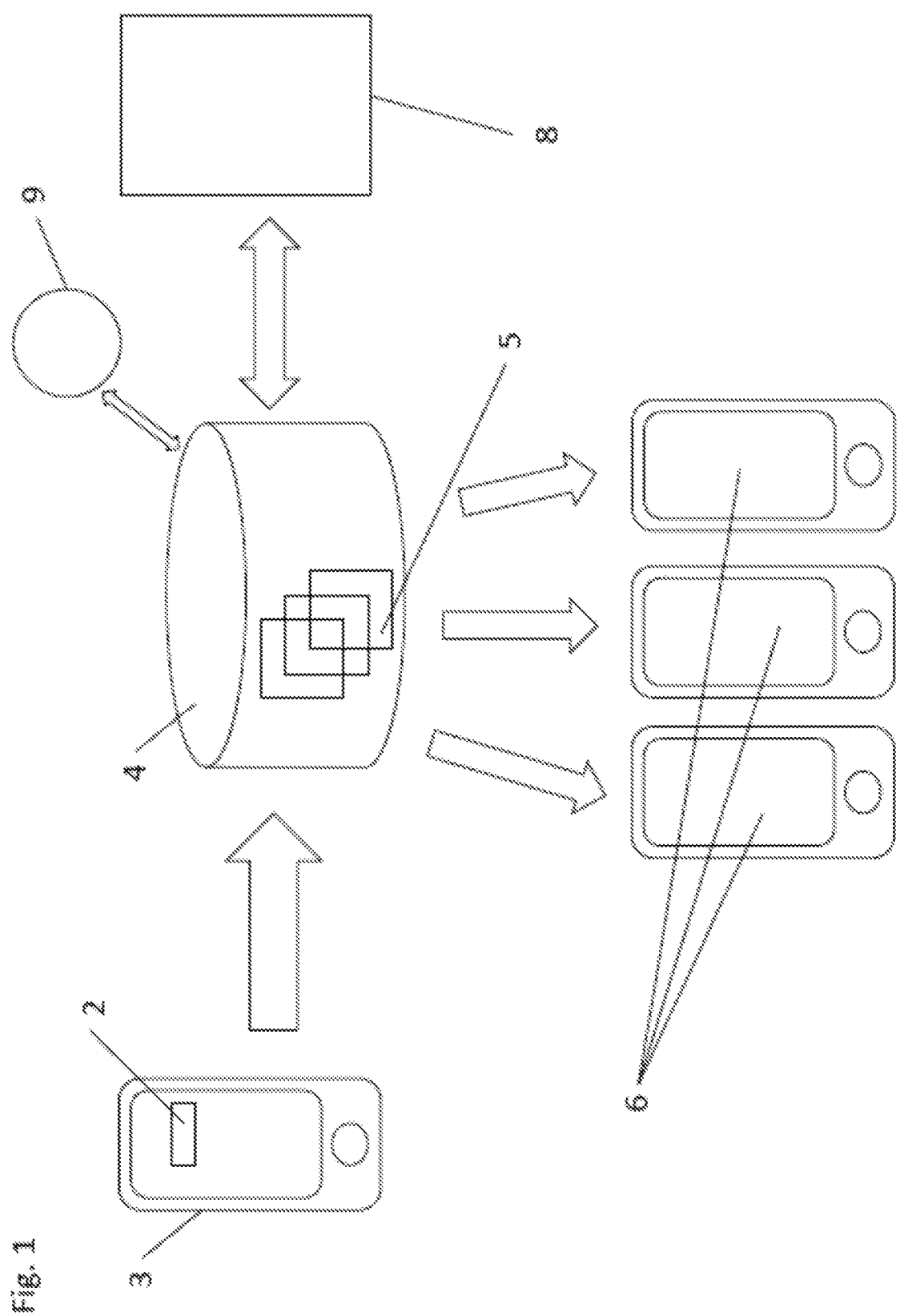
FIG. 1 is a functional diagram of the system, according to an embodiment of the present invention.

Preferred embodiments of the present invention and their advantages may be understood by referring to FIGS. 1-2, wherein like reference numerals refer to like elements.
System Description The primary system and the subsystem 8 are unified at the option of a human or computer controlled end-user. For the purpose of this disclosure, an end-user is primarily defined as an inferior passive viewer whose interactions are optionally limited to scoring and/or commenting upon content which has already been distributed into a social media website display or private (corporate account) forum. An end-user may also be an out of network contact. However, a superior computer client recipient (content receiver) or superior computer client initiator (content sender or system administrator) that enjoys pre-distribution editing and/or manipulation privileges is also, to a lesser degree, an end-user for the purposes of this disclosure.

The present invention provides a predetermined time launched social media photo sharing image and audio alert time release client edit approval application process. The system allows for original pre-release image, audio, or streaming content to be uploaded, scored or rated by preferred contacts in real time in a public or private (corporate account) social media website gallery. The original content competes against imposter content for a higher score rating. In a pre-determined time, the most preferred image(s) remain to be publicly disclosed.

With reference to FIG. 1, the system comprises an app 2 running on a smartphone 3, and a server system 4 within the cloud hosting a master set of files 5, which is selectively disseminated to the apps at predetermined times. The user creates content 6 such as standard photographs, selfie photographs, graphic interchange format images, animation, videos, audio, and streaming media, which are recorded and uploaded to the server system 4 to be viewed, commented upon, shared, tagged, scored, and rated by other users selectively authorized within the users' social network. In the preferred embodiment, the app and the server link or interface to display photo images, selfie photographs, graphic interchange format images, animated images, video images, audio images or audio visual integrated images for display into a social media website via download or cut and paste methods practiced in the prior art.

Delay Period or Editing/Rating Before Posting

With reference to FIG. 2, in step 10, content such as a photo is created. In step 12 the cut off time for the content is determined, before it is posted publicly. In step 13, the mobile subsystem of the user is geo-location tagged for the photos and communication with the system. In step 15 the content is uploaded and retained privately or semi-privately on the server for a predetermined time before being publicly shared. In step 16, a permission list is created for limited users who will receive copies of the content to interact with before the content is universally posted or shared. In step 17, selected users are notified of the presence of the content during the semi-private period through alerts, and are given a chance to access the content. In step 20, within the server, the content may be assigned an alpha or numeric score or rating (abc-123 etc.) for optionally embedding with the content and posting it to non-interactive foreign websites by a plurality of preferred end-users. In step 22, the user(s) are provided with an opportunity to comment on the photo, and in step 23, may manipulate or edit the photo. In step 24, the preferred content is posted in a gallery for display and end-user scoring (essentially crowdsourced voting). The score value is averaged in step 25, and displayed on a website, mobile application, or through an internet facilitated television display, and is averaged and displayed in real time to reflect a real time score value on the computer device(s)' display, representing an amalgamation or average of the plurality of score values in step 30. Each time an end-user assigns a positive or negative numerical score value to the content, the fluctuating number step 36, is visible to any end-user, client initiator (sender or administrator) or client recipient (receiver) who views the website display. The content with the highest score or rating is the preferred content to remain displayed, however, a sender or administrator may select a program function to retain any desired content. In step 40, the content which was not preferred is deleted. And in step 41, undesired or lower scored content self-destructs, expires, vanishes, or are replaced by graphic interchange format images, to then reveal optional advertisements and incentives. However, the advertisements may be prevented from appearing or may be hidden from view, at the option of the recipient end-user, by programming a system stop function.

The assigned score is susceptible to general end-user, client initiator, or client recipient deviation by employing at least one fluctuating alfa or numeric character representing the selected content, and which would occur prior to a predetermined cut off viewing period. Prior to the cut off period, end-users, namely fans (those who up-vote) and non-fans (those who down-vote) may add or subtract scores in step 36, causing the average score to fluctuate positively or negatively until the website display cut off period (perhaps at 12 pm Saturday) expires. However, any number of cut off periods may be implemented to mark an average percentage rating for any desired time period.

The client initiator preferentially selects and/or limits which client recipient(s) may participate in this new, improved, and useful predetermined time launched social media photo sharing image and audio alert release client edit approval application process.

Prior to distribution into a public social media forum, or compatible private (corporate account) integrated forum, the system discourages or prevents images, audio, video, graphic interchange format content, and media content from being captured or downloaded as screenshots by disruption technology known in the prior art.

The subsystem mobile device interface 8 may be downloaded, and synced to an internet, intranet, cloud storage, common server, or electronic storage and distribution host which connects to the primary system and may utilize a device such as a smartphone, tablet, laptop, computer aided television display, or other mini-computing device including a body wearable device such as a smartwatch.

This time launched social media photo sharing image and audio alert release process uses any number or combinations of warnings or alerts known in the prior art to preempt a social media content disbursement or a private (in-house/corporate) content disbursement from a server or cloud means by a computer client initiator for which the computer client recipient may intervene as determined by the computer client initiator.

These identifiers may include one or a combination of the following: a device audio tone warning, a device verbal audio warning, a device vibration warning, a telephone origin call based warning, a tonal warning, a telephone call based device verbal warning, a text based signal notification warning, an SMS based signal notification warning, a handwritten signature replication image based notification warning, an email based correspondence warning, or a GPS location based tag proximity warning to a client recipient's device of an impending content disbursement.

The intervention includes a Photoshop image edit, a text edit, a written replication edit, an image insertion edit, an animation insertion edit, a graphic interchange format insertion edit, a video insertion edit, an audio insertion action edit, or a streaming content insertion edit. These actions are granted at the option of the computer client initiator (sender or administrator) for a limited countdown or count forward period as determined by the computer client initiator.

It is further an intent of this new and improved predetermined time launched social media photo sharing image and audio alert release client edit approval application to introduce a new and improved method by which a computer client recipient and/or a computer client initiator engaged in the aforementioned process may forego said process and only send a text based message, an SMS text based message, a graphic interchange format message, a written image signature replication message, or an email based message for dual or multi-messaging in network notifications concerning the pre-release correspondence as demonstrated in story Embodiment B.

This system further introduces a predetermined time launched social media photo sharing image and audio alert release client edit approval application process whereby a computer client initiator may optionally permit superior in-network client recipients (enhanced permission end-users) and/or out of network inferior client recipients (limited permission end-users), to independently engage in scoring or commenting on content released into the system website gallery, forum, or mobile application display.

Content Rating

The system may utilize any combination of content rating means. For example (perhaps using a 1-5), a number 1 approval rating within a server by an in-network computer client recipient might indicate an image, video, or song should not be released by a client initiator, while a number 5 approval rating might indicate that the content should be released by a client initiator. Any varying combinations of alfa, numeric, or alphanumeric characters may be used to accomplish an image or audio rating approval, including Roman numerals. The system preferentially performs at least one mathematical computation of at least two differentiating numerical score values from at least two client recipient end-users (scorers) to form an average rated score value for the content once it has publically appeared in a social media or private in-house (corporate account) forum. Alternatively, the rating or scoring of content may also occur within the server or within an integrated or facilitated content storage or disbursement system prior to distribution.

The assigned score fluctuates in the negative or positive until the predetermined cut off period ends. After this there can be no further scoring (voting). The cut off period may be set by the user (in profile or piece by piece) or may be hard programmed into the system. The voting process may be conducted via a crowd-sourced, fan-based audience utilizing a television viewing means, an internet viewing means, a telephonic audio calling means, a telephonic digit selection means, a texting means, an SMS notification means, or an email means, whereby revenue is generated from the aforementioned methods.

The election process is conducted to qualify a person or organization of prominence as a limited time representative for the purpose of promoting and revenue sharing via an independent host page optionally integrated within the system.

In addition to the aforementioned, the primary system and the subsystem may sync, link, or interface images, animated images, graphic interchange format images, video based images, audio visual integrated images, or streaming content images for display into a social media website via download or cut and paste methods practiced in the prior art. The assigned score is susceptible to general end-user, client initiator, or client recipient deviation which would occur prior to a predetermined cut off period. Prior to the cut off period, end-users (fans and non-fans) may add or subtract scores causing the average score to fluctuate positively and/or negatively until the aforementioned cut off period (perhaps 12 pm on Saturday) expires. However, any number of cut off periods may be implemented to mark an average percentage rating for any desired time period.

This further introduces a new, improved, and useful predetermined time launched social media photo sharing image and audio alert release client edit approval application process whereby a client initiator or the client recipient preferentially selects a count down or count forward device display notification method in order to preempt a content launch. The optional notification methods may be audible or visual, and may be: A Roman numeral display notification means, an alphabetic display notification means, a numeric display notification means, or an alphanumeric display notification means.

The client initiator selects the date and time of the content launch from the current date up to several years. The client initiator may also select standard time or military time, and such time may count forward or backwards. The client initiator may also select a timed countdown utilizing a strictly alphabetic count forward method (A-Z) or an alphabetic count backwards method (Z-A). Because the English Alphabet contains only 26 letters equivalent to approximately 26 seconds, the client initiator may program any time period between the rates of the alphabetic characters to produce a desired time. The client initiator may select Roman numerals in the same manner to precede the content release event.

This invention further relates to a new, improved, and useful predetermined time launched social media photo sharing image and audio alert release client edit approval process prior to a client initiator's social media content disbursement into a publicly viewable social media forum or a private in-house forum.

This invention further introduces a new, useful, and improved predetermined time launched social media photo sharing image and audio alert release client edit approval process method by which a tangible, computer programmable device is manipulated by a client recipient and/or client initiator to access a Photoshop program, a video manipulation program, an animation filter program, a graphic interchange format image insertion program, an audio edit insertion program, or an audio edit deletion program to engage in the aforementioned process.

This new, improved, and useful system permits a computer client recipient, upon receiving a system notification to preview content of which the recipient has an interest, a limited time to communicate a challenge or interference to the client initiator's pre-release content into a website or mobile application display.

The challenge may be accomplished via a direct device-to-device means excluding the primary system, thereby only using a mobile application (app) means.

This challenge may be through a variety of static or mobile communication methods presently known in the art. For example, a client recipient may send a disapproval message to the client initiator concerning the content during the pre-distribution phase. This communication may be sent directly to the client initiator, or the client recipient may communicate with any number of contacts within the network system.

Content Removal/Destruction

This system further introduces a new and improved time restricted automatic self-destruct content deletion method on content which appears in a website gallery, a mobile application display, or computer integrated television display which does not receive a favorable score, rating, or vote by end-users.

The content can be programmed to rapidly or slowly self-destruct delete by disintegrating, dissolving, morphing, changing appearance, exploding, animating, disappearing, expiring, evolving, or by replacing with graphic interchange format images, from an end-user, client recipient, or client initiator's computer display screen.

As the content is removed, various advertisement banners or links appear revealing products, cash awards, services, discounts, entertainment, or prizes; conversely, the advertisement content itself which remains on the computer display can be removed in the same manner, thereby revealing additional advertisement content or end-user generated content. This process can be continuously consecutive as determined by the system administrator.

A client initiator or system administrator may override which content is subject to the automatic self-destruct deletion method and end-users may prevent or reduce the rate at which advertisement content appears or disrupts on the computer display screen.

Gallery

The aforementioned system further introduces a new, improved, and useful primary system and subsystem which may be programmed and/or configured to disconnect from a public social media forum to operate as a private (corporate or in-house) website gallery.

Location-Based Service

The primary system and subsystem uses a GPS based tagging feature to identify the geolocation of a computer client as practiced. In addition, the system may use standard tagging identification means known in the present art to identify which computer client recipient(s) engaged in a pre-distribution manipulation and/or editing process prior to a content release into a social media, private, or corporate forum during a pre-determined countdown or count forward period as determined by a computer client initiator.

Access Control

In-network contacts are notified by the system sender or administrator of the user's interference authority. These permissions may be limited or expansive and is determined by the content control authority. Within the network, expanded permissions may be practiced in the various ways as delineated within the prior art. One such common method of permission is a simple checkbox that interfaces with the content sender's (initiator) system screen and the content receiver's (recipient) system screen. These preferences appear within the users control functions. For example, as exemplified in public safety Embodiment J, a father is out to dinner. As a condition of punishment for failing in class, his 14 year old high school daughter's phone privileges have been restricted, requiring her to log him into her system as an in-network contact with all permissions. Once all functions have been checked on his daughters system, her father can view all of his allotted permissions, and will be able to preview any content prior to being sent by his daughter to the system forum, or to any other social media website. He may then have an option to review, interfere, or prevent the content from being disbursed.

EXAMPLES

Embodiment A

Video Scoring with End-User Advertisement Incentives

Computer client initiator A uses his iPhone to take 2 selfies of his puppy and kitten next to his face which he plans to turn into a Christmas card for his girlfriend. Selfie 1 has his puppy on the left side of his face and Selfie 2 has his kitten on the left side of his face. A has also taken 2 short videos of the same which he also plans to present to his girlfriend.

Video 1 shows his puppy barking, and video 2 shows his kitten meowing and licking him. A is not sure which selfie is the cutest or which video is the best for his Christmas gift and so A decides to post both selfies and both video's on his primary system gallery for end-user scoring and opinions. A had previously programmed his iPhone so that it would automatically upload photograph and video content into his a cloud server immediately after the content was captured. A's cloud server has also been programmed to release his photographs and video's into his primary system gallery 5 minutes after the content had been stored within his server. A sent 2 message corresponding with the 2 selfies and 2 videos he uploaded which asked "Which selfie will make the cutest Christmas card? Please score."

And

"Which video makes the best present? Please score."

A had not granted any prior administrative permission for any of his pre-selected in-network contacts to alter, edit, or manipulate his content during the pre-release phase. His close in-network contacts were therefore not notified of the impending launch while the selfies and videos were in the server during the 5 minute pre-release time. A only wanted his close in-network contacts to score his content when it arrived in the gallery in the same manner as general out of network end-user viewers. A had also previously set his image scoring cut off deadline for 3 days, after which time neither his selfies nor his videos could be scored any longer. A had configured his primary system gallery to allow any end-user to comment upon, score, and compare his selfies and videos within the online gallery. A had programmed the system so that content with the lowest score would slowly dissolve away. After the selfies and videos had posted to the gallery, several animal welfare organizations, in-network contacts, and general end-users were notified that A had posted content under A's animal category and begin to score it. After 3 days and 2 hours had passed A looked at his gallery and saw that selfie 1 had a final score of 57% while selfie 2 had a final score of 43%. A also noticed that video 2 had completely vanished and a score of 70% appeared in its place. video 1 remained as the preferred video, displaying an 85% score rating. A also noticed that selfie 2 had completely dissolved away revealing a gift certificate for a 50% off dinner at Red Lobster. A clicks on the advertisement link and redeems his gift certificate. Several other end-users who are not affiliated with A but who had been watching A's content also redeemed the 50% off certificate before the advertisement had completely vanished from the computer display. A also likes to look at car advertisements on the primary system and mobile subsystem (app) because he is aware that several end-users in his home state had won a new Apple smart car.

Embodiment B

The High School Dance

Computer client initiator A has 2,000 in-network and out of network contacts synched from her various social media websites into her smartphone. Of the 2,000 contacts, A has checked a box next to the names of 15 high school friends who are alerted as to when and what type of content A will post so they can decide in advance if they want to rate or score it. Of the 15 friends, A has checked an additional permission box next to 4 other friends B, C, D & E on her cheer squad which gives them additional pre-release edit permissions on any content she sends out. A sends a text message from her smartphone using the downloaded application (app) subsystem to computer client recipients B, C, & D concerning her observations at the high school dance the previous night where A, B, C, D & E were all present. The pre-released message is "Hey girls, I thought E's red dress at the dance was a bit too skimpy." A sends a GIF image after the message expressing her disapproval.

A chose not to select (or de-selects) E from her contacts as an eligible message recipient because she does not know E as well and is not sure how E will take the message. A also selects two additional social media websites of which she and her girlfriends are members to potentially send her message to. When A sends the message, B's cell phone is triggered with an optional audio verbal alert (determined by client recipient's device setting). B's heart skips a beat when she hears "A's message about you will hit Facebook and Twitter in 5 minutes."

B was in the middle of an important conversation on her cell phone with her new boyfriend when the message came out. Worried that she might be mentioned, B tells her boyfriend she will call him back in a few minutes and ends the call. The digital display on B's smartphone shows a large adjustable descending numerical countdown. This means B has a limited time (4 mins 45 seconds left) to message A concerning the pre-release message. B sends a message back to A which reads "OMG! I thought it was so fleek! (Cool). Gotta call Doug back . . . ttylr!" B also sends a GIF of a celebrity giving a thumbs up.

C's primary system (not a mobile app) laptop is simultaneously triggered with an audio prompt notification on her social media website which is interfaced with A, B, D, & E. C clicks on her message notification prompt. The message reads "A's message about you will hit Facebook and Twitter in 5 minutes."

The display screen on C's laptop also shows a large adjustable descending numerical countdown. C has a limited time (4 mins 10 secs) left to message A. C sends a message to A which reads "I didn't like it either. FYI . . . E's mother is your new math teacher."

D's smartwatch is simultaneously triggered with an audio tone notification on her social media website subsystem app. The message reads "A's message about you will hit Facebook and Twitter in 5 minutes."

D has a limited time (4 mins 23 seconds) left to message A. Since A's message doesn't concern D, and doesn't include a bad selfie or video of D, and since D is busy, she chooses to ignore the message.

After A reads the messages from B & C, client initiator A terminates the countdown with 30 seconds remaining, thereby preventing the message from being launched onto Facebook and Twitter. A, B, C, & D's devices receive displays and/or audio announcements with the message "A cancelled the message about you. Have a wonderful day" (emoticon).

Because the termination did not involve the potential release of images such as a SELFI, group photographs, photographs of objects, images, animation, video, or audio, client initiator A is preferentially not penalized or charged a fee.

Embodiment C

The College Graduate

Two years after graduating from college, computer client initiator A jokingly sends a pre-release photo of himself with his fraternity brothers B, C, & D from his cell phone to his website gallery and his Instagram gallery using the downloaded application (app) subsystem. In the photo, they are all at a beach party in Daytona, Fla. during spring break. It also shows B taking a selfie of himself wearing a G-string stuffed with dollar bills as he holds up a beer and French kisses a donkey wearing a priest's collar. Several people, including A, C, & D, are in the photo cheering him on and placing dollar bills in his G-string. B shared the selfie with A, C & D who now live in different parts of the country but stay in contact on social media. B decides he no longer wants to work in corporate America and wants to be a Catholic priest and has applied for admission into the seminary. B is waiting for his final background interview, and all looks very promising for him. B is in the office with the admissions director when his cell phone rings and audibly announces "Get off your butt! A's crazy spring break photo of you hits the SNELFI gallery and Instagram in 5 minutes."

B's heart skips as his cell phone starts an audible, reverse alpha character countdown (which B silences) from Z to A (Example: Z-Y-X-W-V-U etc.) which A set to last for 5 minutes. B has a very limited time (4 mins 15 seconds) left to message A not to release the embarrassing selfie because it may damage his chance of entering the seminary. Luckily for B, the admissions director was on the phone and excused himself for some urgent business. C's primary system (not a mobile app) laptop is simultaneously triggered with an audio prompt notification on his primary system social media website which is interfaced with A, B, & D. C clicks on his message notification prompt. The message reads "Get off your butt! A's crazy spring break photo of you hits the gallery and Instagram in 5 minutes."

The display screen on C's laptop also shows a large adjustable, descending, numerical countdown. C has a limited time (4 mins 10 secs left) to message A. C sees the photo and cracks up, reminiscing about their crazy, college days. The message prompt on the display gives C an option to reply to the pre-release photo. The choices read 1) SNEND IT! (Send it) C may or may not add a comment. A receives the comment and the photo continues as scheduled. C may optionally rate the selfie if and when it posts to the primary system website gallery (not the app). For example, C may rate it a 5, meaning the photo is awesome! The system may also display a percentage or alpha score rating.

2) SNELF IT! (Shelf it; send later.) C may make a comment if he desires.

3) SNIP IT! (No way; you pay!) A 99 cent penalty is paid by A to stop the photo.

4) SNOP IT! (Stop it! No way; I'll pay!) A 99 cent penalty is paid by C to stop the photo).

Since C thinks the photo is funny, he does not try to stop it. However C is in the photo placing a dollar bill in A's G-string. Because C is now married and does not want his wife to see, C accesses the photo editing feature and erases his (C's) head from his body. C uses the stylus pen on his Android phone and writes a question mark (?) where his (C's) head was and writes "Guess who? Lol."

C could have optionally used emoticons or images of others to disguise his face. D's Apple smartwatch is simultaneously triggered with an audio tone notification on his social media website subsystem app. When D finally reads the message, the display reads "Get off your butt! A's crazy spring break photo of you hits SNELFI and Instagram in 5 minutes."

D decides to check the bigger screen on his iPhone which is synced with his Apple smartwatch. It reads 1) SNEND IT! (Send it) D may or may not add a comment. A receives the comment and the photo continues as scheduled. D may optionally rate the selfie if and when it posts to the primary system website gallery (not the app). For example, D may rate it a 4, meaning the photo is very good! The system may also display a percentage or alpha score rating.

2) SNELF IT! (Shelf it! Send later.) D may make a comment if he desires.

3) SNIP IT! (No way; you pay!) A 99 cent penalty is paid by A to stop the photo.

4) SNOP IT! (Stop it! No way; I'll pay!) A 99 cent penalty is paid by D to stop the photo.

D is not doing anything ridiculous in the photo but notices that C has erased his (C's) head. D writes a comment on the photo and draws an arrow pointing to C which reads "Nice disguise, C . . . LMAO."

The countdown continues as scheduled. Several minutes later the SELFI is released onto the primary system website gallery which is linked or synced to A, B, C, & D's in-network subsystem apps.

At the option of A (as determined by A's settings), viewing, general public end-users that have not been downloaded as personal in-network contacts by A, are preferentially able to score content which has already been distributed into a selected website forum. However A may optionally block any end-user desired.

A, B, C, & D are able to identify which in-network recipient made the comments and/or Photoshopped the selfie. This is exemplified in Embodiment E. The Photoshopped images are also shared on Instagram.

The following week, A decides to share the original selfie in the primary system gallery for all to see, compare, and continuously rate against A's edited SELFI. The numerical score values of A's selfie preferentially change in real time, reflecting a percentage average in the website gallery each time an end-user adds or subtracts a score value to the images. The final percentage approval rating of the content is locked in at a predetermined date and/or time after which the score rating cannot be changed in the website gallery.

Embodiment D

In-Network Recipient Identifier Restrictions.

A has configured his gallery to only allow his personal in-network contacts to score and/or rate his posted content. Approximately 1 hour after A released an embarrassing selfie of B at a spring break beach party, B turns on a desktop computer in the seminary administrator's office. B logs onto his website gallery and sees an embarrassing photo of him (B) with a donkey. The selfie has already been scored by over 200 in-network contacts shared by A, B, C, & D, and presently enjoys a fluctuating score between 80-95%. A's in-network contacts were not able to view the selfie, nor were they invited by A to exercise editing or manipulation privileges of the selfie during the social media pre-distribution phase. The display on B's desktop also shows that the selfie has also been shared on Instagram.

The primary system includes all of the functions of its optionally employed mobile subsystem application (app). In the context concerning the operation between the two platforms, the primary system uses a standard, stationary, or static desktop or laptop computer-based social media website access means.

The mobile system app also uses a computer-based social media website or device such as a mobile phone, tablet, laptop computer, watch, or other wearable or transportable technology known in the prior art.

An end-user computer client recipient or computer client initiator need not possess the primary system or subsystem in order to engage in the aforementioned process but can enjoy the capabilities of this new, improved, and useful technology separately or independently of the primary system or subsystem as exemplified in Embodiment C.

Embodiment E

Mobile Apps and In-Network Identifiers.

Two years after graduating from college, computer client initiator A jokingly sends a pre-release photo of himself with his fraternity brothers, B, C, & D, from his cell phone to his Instagram and Pinterest using the downloaded application (app) subsystem. In the photo, they are all at a beach party in Daytona, Fla. during spring break. It also shows B taking a selfie of himself wearing a G-string stuffed with dollar bills as he holds up a beer and French kisses a donkey wearing a priest's collar. Several people, including A, C, & D, are in the photo cheering him on and placing dollars in his G-string. B shared the selfie with A, C, & D who now live in different parts of the country but stay in contact on social media. B decides he no longer wants to work in corporate America and wants to be a Catholic priest and has applied for admission into the seminary. B is waiting for his final background interview, and all looks very promising for him. B is in the office with the admissions director when his cell phone vibrates and audibly announces "Get off your butt! A's crazy spring break photo of you hits Instagram and Pinterest in 5 minutes."

B's heart skips as his cell phone starts an audible numeric countdown which B silences and which accounts for 5 minutes (determined by A). B has a very limited time (4 mins 15 seconds left) to message A to not release the embarrassing photo because it may damage his chance of entering the seminary. Luckily for B, the admissions director was on the phone and excused himself for some urgent business. C's subsystem app on his cell phone simultaneously vibrates. C checks the message which reads "Get off your butt! A's crazy spring break photo of you hits Instagram and Pinterest in 5 minutes."

The display screen on C's cell phone also shows a silent, adjustable, descending numeric countdown across his screen. C has a limited time (4 mins 10 secs left) to message A. C sees the photo and cracks up, reminiscing about their crazy college days. The message prompt on the display gives C an option to reply directly to A's pre-release photo. The text prompt on C's screen reads 1) SNEND IT! (Send it) C may or may not add a comment about the photo. However, because there is no primary system website gallery to post it to, the comment is optionally only seen by client initiator A. If the comment is made, A receives the comment and the photo continues as scheduled.

2) SNELF IT! (Shelf it! Send later.) C may make a comment if he desires.

3) SNIP IT! (No way! You pay!) A 99 cent penalty is paid by A to stop photo.

4) SNOP IT! (No way I'll pay!) A 99 cent penalty is paid by C to stop the photo.

Since C thinks the photo is funny, he does not try to stop it. However, C is in the photo placing a dollar bill in A's G-string. Because C is now married and does not want his wife to see (they share Instagram and Pinterest accounts), C accesses the editing feature and erases his (C's) head from his body. C uses his stylus pen and writes a question mark (?) where his (C's) head was. It reads "Guess who? Lol."

C could have optionally used emoticons or images of others to disguise his face. D's smartwatch is simultaneously triggered with an audio tone notification. When D finally reads the message, the display reads "Get off your butt! A's crazy spring break photo of you hits Instagram and Pinterest in 5 minutes."

D decides to check the bigger screen on his iPhone which is synced with his Apple watch. It reads 1) SNEND IT! (Send it) D may or may not add a comment about the photo. However, because there is no primary system website gallery to post it to, the comment is optionally only seen by client initiator A. If the comment is made, A receives the comment, and the photo continues as scheduled.

2) SNELF IT! (Shelf it! Send later) D may make a comment if he desires.

3) SNIP IT! (No way you pay! 99 cent penalty paid by A to stop photo).

4) SNOP IT! (No way I'll pay! 99 cent paid by D to stop photo).

D is not doing anything ridiculous in the photo but he notices the system has identified C as the in-network user who has erased his (C's) own head. D writes a comment on the photo and draws an arrow pointing to C which reads "Nice disguise C . . . LMBOFF."

A sees the comment concerning the manipulated selfie, and the countdown continues as scheduled. Several minutes later the selfie is released onto Instagram and Pinterest. Because there is no interactive primary system website gallery, any comments and ratings only appear on the selfie if they were photoshopped, embedded, attached, or superimposed on or with the actual image by D during the edit window set by A. In the preferred embodiment, A, B C, & D are able to identify which in-network recipient(s) made comments or alterations to the selfie prior to it being released to an independent or foreign website.

Embodiment F

App Stores

A social media website A and an optionally downloadable mobile application. The application (app) may be downloaded from an app store host B or other website, internet, intranet, or cloud based means C. The mobile based platform may optionally utilize a plurality of devices D such as a cell phone, tablet, laptop, or other internet, intranet, or cloud based computer server or limited distance electronic device(s) known in the present art.

Facebook, Instagram, Twitter, Pinterest, Snapchat

Android Play store and Apple Store for purchasing apps.

A program may be downloaded directly from Google, Microsoft, Apple etc. using a mobile, desktop, or laptop computer.

Android smartphone, iPhone smartphone, or Motorola two-way radio phone.

The primary system preferentially includes all the functions of the inferior subsystem (app). However, by virtue of its more stationary platform, the primary system (such as on a desktop or laptop) may employ additional computing power and enhanced processing capabilities than its optionally employed subsystem, thereby enhancing the features of the inferior system when the two systems sync, link, or interface.

The two systems, when joined, form a duel or multi-unit social media communication platform thereby joining an independent computer client initiator(s) with at least one computer client recipient(s) through the optional primary system or optional subsystem.

Both systems function in sync or as independent applications utilizing a predetermined time launched social media photo sharing image and audio alert release client edit approval application based platform.

The aforementioned system additionally links the computer based client initiator with the computer client recipient through communicative storage and display disbursement device means already known in the present art such as cell phones, mobile devices, tablet devices, television devices, mobile or static computer based internet device application systems, mobile or static intranet computer based application systems, or cloud based means.

This new, improved, and useful system preferentially permits a computer client recipient and a computer client initiator to mutually engage in a predetermined time launched social media photo sharing image and audio alert release client edit approval application process identification means via a device visual screen or a signaled communicative notification interface means to optionally identify which initiator and/or recipient tagged, edited, photo shopped, audio altered, added images, GIFs, graphics, writings, or inserted emoticons into the medium prior to distribution into a social media forum.

It is further an intent of this new and improved predetermined time launched social media photo sharing image and audio alert release client edit approval application based process platform, in conjunction with the aforementioned device(s), to introduce a new and improved method of commerce optionally utilizing a plurality of payment methods used in the present art.

Methods of payment for the system may include the following: i) a POS person to person store based payment processing means utilizing a credit card, debit card, check, or money order, ii) a POS person to person or store based payment processor using cash transactions, iii) an Android payment device system, iv) an Google pay device or system, v) an Apple payment device system, vi) a PayPal payment device system, vii) a Square payment device system, viii) a numerical transferable system representing virtual currency, and ix) a point transferable system representing a consumer trade value.

Advertising

This system further introduces a new, improved, and useful method of advertising and commerce consisting of a predetermined time launched social media photo sharing image and audio alert release client edit approval application process by way of an activation link or interface connection displayed on a static or mobile computer device(s) visual surface to connect to, associate with, or interact with an independent webpage of a person or organization such as a celebrity, producer, singer, sports athlete, sports organization, private person, political entity, politician, company, corporation, LLC, partnership, non-profit, or sole proprietor.

The voting process may be conducted via a fan-based audience utilizing a television viewing means, an internet viewing means, a telephonic audio calling means, a telephonic digit selection means, a texting means, an SMS notification means, or an email means, whereby revenue is generated from the aforementioned methods.

The election process is conducted to qualify said person or organization of prominence as a limited time representative for the purpose of promoting and revenue sharing via an independent host page.

The independent webpage is owned by, used by, assigned by, assigned to, sponsored by, leased by, leased to, or associated with said person or organization of prominence for the purpose of self-promotion and advertising via a new, improved, and useful predetermined time launched social media photo sharing image and audio alert release client edit approval process.

Embodiment G

Talk Shows

In one embodiment, A is a prominent daytime talk show host and has a very large following. A is known for taking famous selfies, dancing, and interacting with her audience. A's television network has been in a rating war with B who is gaining a large social media following. The display screen on both the primary system and the subsystem mobile app has an interactive link to a website which represents A who currently holds the honorary title of "Selfie President of Daytime Television." A has been elected for a second one-year term. Because A and/or her network represent this position, they have had content control over an entire advertising page on the primary system website and the mobile subsystem app for each of the one year elected terms. A can only win the election for 3 years in a row, at which time she is ineligible to run for a designated period of time, perhaps 1-3 years. A was elected by her fans after audience members texted or called in votes. At the time of her election, A had been competing against several daytime talk show hosts for the 1 year elected term. B (like A) encouraged his fans to text or call in votes for his show via the website or mobile app. However, B had lost the two previous elections. This year, however, B's network embarked on a social media photo and selfie sharing campaign. It was just announced on the website that B's network won the election. B's television network chooses to place a link of streaming video of B's talk show along with sponsored advertisements on the primary system website gallery.

Embodiment H

Sports

During the 1986-1987 NBA Finals, Los Angeles based team A played Boston based team B. Los Angeles based team A won 4 games, while Boston based team B won 2 games. Despite team A's championship win, before team A can link their webpage on the system gallery; team A and B must compete in a fan based voting process. Fans for team B and fans for team A text or dial their votes from cell phones, phones, or other computer devices. After the voting process, Los Angeles based team A wins. Since A's network won the election, team A places its NBA team webpage on the primary system website and also on the mobile system app where team A (NBA) has content control for one year.

Embodiment I

Professional Music Promotions

A (Sailor Drift) is a female country western singer who went mainstream pop and now has 68 million Twitter followers, 35 million Instagram followers, and 70 million SNELFI followers. B (Satie Airy) is a female pop singer who directly competes with A. B has over 80 million Twitter followers, 34 million Instagram followers, and 50 million SNELFI followers. C (Fussin Beaver) is a former boy singer who is now a mainstream hip-hop artist. C has 71 million Twitter followers, 48 million Instagram followers, and 60 million SNELFI followers. Last year C solicited the most votes on the SNELFI website and was awarded the honorary title of SNELFI President—in the hip-hop music category. As a result, C has been able to capitalize on album sales, music downloads, and advertisements through the website. This has helped C tremendously because C has had content control over the primary system and the subsystem app via an interactive link which connects directly to C's webpage for advertisement and sponsors during his one year elected term. B has just released her much anticipated album. As a result, her fan base increased and she was able to solicit more votes on the website than A & C. Effective Jan. 1, 2018, it is announced on the website that B now holds the title of SNELFI President—POP category. As a result, a link to B's website or sponsor immediately replaces C's link in the SNELFI webpage gallery.

Embodiment J

Public Safety and High School Drama

Client recipient parent A is out to dinner with a friend. A left her 16 year old niece B at her Beverly Hills mansion to babysit her 8 year old twins; son C and daughter D. Last month, police canvassed A's neighborhood searching for a paroled sex offender who failed to register and was never found. Both A and B are family friends on her SNELFI website and on Facebook. A has the subsystem app on her Android and B has it on her iPhone. B uses A's desktop computer and signs onto her primary system gallery to see if her real time photo and video score averages have changed. B and her ex-boyfriend G are homecoming queen and king at the high school. B sees one of her original unedited selfies she took at the mall 3 weeks ago with girlfriends E & F. B's ex-boyfriend G had made an unexpected appearance (photo-bombed) in one of B's selfies. However, B erased G's head from one of the selfies. B also wrote an expletive over G's headless body because G was rumored to have kissed her sworn enemy. This is something G has adamantly denied. G has been begging B for another chance. B's name appears in the primary system gallery as the person who erased G's head from her selfie (the entire school knows). Another selfie in the gallery is almost identical to the original and G's head is even intact. E & F have airbrushed and photoshopped more makeup on their faces in their own versions of B's original selfie. B looks at the ratings in the gallery. B is surprised to see the selfie with her and G which had not been manipulated, has a fluctuating approval rating between 75-80%. The other (headless) selfie is significantly lower. The ratings are from B's personal contacts and also from other students (end-users). There are 2 more days until the averages are locked in the gallery. B, E, & F are aware the word is out at school of B & G's break up, and students will be scoring her selfies before next Friday's cut off. Word is also out that B will give G another chance if her original (photo-bombed) selfie with G hits a 90% locked in approval. This would be a general consensus the students believe G is not a cheater. However, B has configured her systems so only her close in-network contacts are permitted to comment on her gallery content. Several hours later, B messages E & F about her aunt's (A's) beautiful house. E asks B to take some photos of the inside and outside of the house and to post it so she and F can score it in the gallery. B agrees and uploads several photos of A's house. B uploads the photos to a category called Gorgeous Homes. Meanwhile, A is enjoying a glass of wine at the restaurant when her cell phone vibrates, rings, and audibly announces "A photo at your house hits the SNELFI gallery in 15 minutes . . . Facebook in 15 minutes . . . Instagram in 20 . . . Snapchat in 25 minutes . . . and Pinterest in 30 minutes."

A opens her app and looks into B's pre-release cloud server. A reverse Roman numeral (B likes math) countdown is displayed in B's cloud and is viewable on A's phone. It's followed by subsequent photos and also displays the various social media websites where the content will be released to at the expiration of the time clock.

A is able to see various photos of the inside of her home. Her children appear in some of the photos. There is also an exterior photo of A's home which shows the intersection near A's home. A's cellphone displays the following interactive links A) SNEND (Send now!) A may make a comment if she desires.

B) SNELF IT! (Shelf it! Send later) A may make a comment if she desires.

C) SNIP IT! (No way! You pay!) A 99 cent penalty is paid by B to stop the photo.

D) SNOP IT! (No way! I'll pay!) A 99 cent penalty is paid by C to stop the photo.

A tries calling B, but she cannot get a signal. A reviews the options displayed on her phone and chooses option SNIP IT!

B receives the SNIP IT! message in her cloud and texts a reply to A that she (B) cannot stop the photo without paying a 99 cent penalty which she does not have. A pays 99 cents with her credit card. A, B, C, E, & F are notified with the following message "A has elected to SNOP the photos of the house . . . Thank you."

Embodiment K

Private Corporate Account

In another embodiment, A, the Editor-in-Chief of *En Vose*, a well-known French women's modeling magazine, has purchased a private corporate gallery account. The company account uses its own cloud based server and is restricted to a select group of creative executive editors in charge of approving all photos before being published. World-renowned photographer B is known for being very creative and sometimes over the top. B has just finished a magazine cover shoot with British Princess C who appears to be having a wardrobe malfunction in one of the photos. The magazine issue is due to be launched in 2 weeks. B sends out his proposed cover photo with the required 2 week countdown. The corporate account permissions are optionally configured to allow the cover photo to be scored or rated prior to being disbursed into the corporate primary system website gallery. The 5 creative executives give the photo a low score because they believe it could create negative political ramifications between Great Britain and France. Once the scores are placed during the pre-distribution phase, they are averaged in real time. The final scores would not fluctuate unless A also scores the photos. If this occurred, the photo average would change in real time. The executives request B to send the cover photo again with 3 additional photo covers for comparison. B sends his preferred photo again along with 3 alternative covers as requested. The executives air brush, Photoshop, and score all of the photos, leaving B's #1 choice cover photo with the lowest average score against consensus photo #4. Later on A, who is vacationing in New York, uses is iPhone to score the #4 photo higher in consensus with his creative executives. This causes photo #4 to fluctuate to the highest score value among all the proposed covers. A also makes a comment, chastising B for wanting to use a cover photo of the British Princess C who was having an apparent wardrobe malfunction. B is angry and demands his more provocative photo of the princess be used, or he will quit. The approved cover is released for additional cover and advertising design to lower level artists at the magazine. Precisely 5 days before the magazine us due to hit the stands, the cover is pre-released on the primary system advertisement page and also to selected advertisers who pay a premium to use the images. The following week, A is a freelance wedding photographer.

In conjunction with the aforementioned, this new and improved predetermined time launched social media photo sharing image and audio alert release client edit approval application is preferentially connected to at least one social media website through a computer internet, intranet, server, cloud based storage and disbursement platform, or a programmable storage electrical relay device.

It is further an intent of this new and improved predetermined time launched social media photo sharing image and audio alert release client edit approval application to permit a computer client initiator to allow access and permission to the computer client receiver to engage in a limited term edit and/or content manipulation process. The process is programmable by the computer client initiator who, due to content launch from a pre-release storage means (server, cloud, or electrical device), serves as the system function administrator with primary default permissions.

Embodiment L

Routine Communications

Client recipient B sends a GIF, text message, email, and frown face emoticon to client recipient A, indicating his disapproval of a selfie to be released by A on Instagram in 10 minutes. The client recipient has the option of requesting the delay, release, or prevention of an image content prior to any content being released from the client initiator's cloud storage, server, or device.

Embodiment M

Drones

A has just purchased a drone which was specifically designed to carry his iPhone and take aerial video and photographs. The drone can be controlled by his Apple watch and can climb as high as 400 feet and hover for about 20 minutes. A and his wife B decide to go on a hiking trip in the Grand Canyon. A and B have both downloaded the free app on their smartphones, and they also have accounts on the primary website gallery. A has created a category on the website gallery titled "My Vacations" where he plans on posting videos and photos from his trip. A & B are synced in each other's phones as contacts. A has 500 in-network contacts in his phone who are able to (with additional permission) edit the content he posts to his website gallery. A looks through his contacts and remembers that 2 people in his contact list are no longer his friends. A deselects them, effectively blocking their ability to edit his photos during the pre-distribution phase. However, this would not prevent them from rating any photo once it has posted to the website gallery. A looks at his wife's name in the contact list and checks a box next to her name which allows her specific permission to edit his content during the pre-distribution phase. A pairs his iPhone with his drone and smartwatch, thereby setting the drone to take aerial videos for 3 minutes and photos for 2 minutes, after which time the drone is programmed to return to A. A's iPhone is configured so when the video is finished it will immediately sync to the cloud, where it will remain for one hour. After one hour, the video will automatically post to the website gallery. The photos are set to post to the website gallery 10 minutes after the video. A remembers not all of his friends have the new app. A configures the system to post the same photos and/or videos on Instagram and Facebook in one week. After several hours of hiking, they come to a large cliff overlooking a vast canyon. B points out a mountain lion deep in the canyon stalking a mountain goat. A removes his drone from its pack and makes the appropriate adjustment. A then launches his drone which is now carrying his iPhone. A guides the drone with his smartwatch. The drone captures footage of the mountain lion chasing, capturing, and killing the mountain goat. The drone photographs the lion as it begins to devour the mountain goat. The drone returns to A at the programmed time. B's Android phone rings and announces "A vacation video of you will post to the gallery in 47 minutes."

"It will post to Facebook and Instagram in 1 week."

B sees the numbers on her phone counting backwards. B silences the phone and opens the cloud. B watches the video and thinks the lion killing the goat is too graphic. B accesses a video editing tool to place a haze over the lion actually killing the goat. B does not tell her husband who is busy with his drone. Precisely 35 minutes later, the photos and video appear in the gallery. Several friends begin to score the video and photos. The video receives a fluctuating score between 50-60%. A looks in his gallery and notices B has hazed out the lion killing the goat. A is not happy because A believes it's just part of nature. A opens the contacts and revokes B's editing permission. A sends the video again, and it is immediately posted next to the edited video. By the end of the week, the edited video has a locked in approval score of 62%, while A's unedited video has a locked in approval score of 91%.

Embodiment N

Reality Television

In the morning hours, A (I AM BEST) snapped a photo of his girlfriend B (Jen Zardashina). A and B have the free app on their cell phones. A has set his device so that photos he takes are instantly uploaded into his cloud. B was not wearing any makeup at the time the photo was taken, and she does not like the photo. B does, however, like the way her breasts look, but she wants her butt to look much bigger. B went out later that night to a red carpet event in Hollywood. A, who really liked the photo, is now in New York, and he is about to perform at a concert. A has also programmed his phone to send his photo and video content to his SNELFI gallery, Instagram gallery, Facebook page, Pinterest gallery, and his Twitter page at a 12 hour window. There are now only 2 hours left before the photo of B goes live on his pre-selected social media pages. Because A had already selected a release time; it is not necessary for A to press SNEND (send) on his cell phone. B's cell phone vibrates and displays "Your photo hits, Instagram, Facebook, Pinterest, and Twitter in 1 hour and 53 minutes . . . Love . . . I AM BEST!"

A thinks her face looks horrible without makeup and her butt is too small. A sends B a dislike GIF and a message through the app saying she dislikes the way her face and butt look but her breasts look perfect. Since A has already sent the photo, the system prohibits A from stopping its release on his selected social media pages. The only way A can stop the photos from being released is by paying a penalty (perhaps 99 cents). A either wants the photo to go live or he does not desire to pay another penalty. Furthermore, A did not notice the message from B because he is about to go on stage. B is now in the middle of a live television interview at the Grammys. B asked her assistant C to try to reach A, but C has no luck. Now there are only 20 minutes left before the photo of B goes live to her 54.4 million Instagram followers, 37.8 million Twitter followers, 10.5 million Facebook followers, 5 million Pinterest followers, and 80 million SNELFI followers. There are now 10 minutes left before the photos go live. B takes a 5 minute commercial break from her interview. B accesses the pre-release photo which she and other in-network contacts share in the cloud with A. B remembers she can manipulate the photo by accessing a Photoshop and air brushing tool accessible through the application. B is in the middle of fixing her face with the app, but there are only 4 minutes left and B has just been called back to the live television interview. B notices her makeup artist D who was the one who told her about the SNELFI app. B hurriedly asks her makeup artist to fix her face and make her breasts look even bigger. B also emphasizes to D that she wants D to also make her butt look much bigger than it already appears because B feels it looks small and the paparazzi will have a field day if this photo goes live. B runs back and takes her place in front of the camera just in time to go back on live television. Her makeup artist professionally airbrushes the photo and places virtual makeup on B's face, making B look beautiful. Now there are only 15 seconds left. D is unable to finish and there are 12 seconds left. The makeup artist uses a stylus pen attached to B's Android phone and erases B's entire body, leaving B's bodiless head and face suspended in the photo. D panics and quickly fills the blank where B's body was with the words, "SORRY JEN." A moment later, A's photo of his girlfriend B's bodiless head goes live to over two hundred million followers. The photo appears in the SNELFI gallery in a category titled "Glamorous Women."

After the photo is posted in the gallery, B's fans (and haters) begin to score the photo of B. B checks the image to see her real-time score value is fluctuating between 60-90%. By Saturday at 12 pm, the final approval rating for B's photo is permanently locked at a 67% approval rating.

Preferentially A may also release the original photo in the gallery for end-users and in-network contacts to score and rate against the original for comparison.

Embodiment O

Fashion

A has been named by SNELFI Magazine as the world's most beautiful supermodel for 4 years in a row and has amassed a personal fortune of over 200 million dollars from photo shoots and license deals to use photos of A's face. It is well known by the paparazzi that A wouldn't be caught dead or alive appearing in any natural photoshoot or taking a SNELFI (a selfie) without any makeup on. As a matter of fact, this clause has been written into A's contract. Any such photo of A would command about a billion dollars. A and her boyfriend B had a heavy night of partying in Paris. Both were intoxicated when B took two bathroom SNELFIES (with a toilet in the background) after A had removed all of her makeup before going to bed. Before B had snapped the SNELFIES (a fun mobile app), he had previously set his Android device to immediately upload all content, including videos, into his cloud server. B had also set the visual time clock to appear in the cloud next to the SNELFIES to automatically countdown to a specific time before being released into his SNELFI gallery. B had also programmed the application so that all photo images he took would remain in his SNELFI cloud server for 5 hours, and all video, streaming, and music uploads would remain in his cloud for 2 hours before being released to his gallery or other foreign websites. B could have also selected the checkbox on his mobile application to only send the photos to one or more non-interactive foreign sites such as Facebook, Instagram, Twitter, Pinterest, etc. However, B had programmed the device so that the 2 SNELFIES would only be sent to his SNELFI gallery. This way, B's 20 in-network contacts (A & B's close friends) and their 1,000 combined out of network contacts (limited permission public friends) will have the ability to interactively compare and score the SNELFI photos once they reach the system gallery and before the scoring clock expires. B could have also selected a check box on his mobile or desktop to allow any one of his 500 out of network contacts permission to alter the images before reaching the system gallery. However, B only wants his in-network contacts to have this permission. B was aware that once he snapped an image, he would be unable to stop the content launch clock to prevent it from being released to his selected social media websites without a penalty (perhaps 99 cents or a system lockout). Before B had taken the two SNELFIES, B had also set his device so that all of his uploaded content would be released from the cloud server to his interactive SNELFI gallery, where they would be scored by B & A's in-network and out of network contacts/friends. B could have also selected a check box to prevent his out of network contacts from scoring the SNELFIES when they appear in the gallery. When the photos finally appear in the gallery, another time clock will appear. B had already set his time clock so that his image content will remain within the gallery to be scored for 7 days and 3 hours. After this time period expires, contacts can no longer score it. The SNELFI of A and B with the highest score will remain visible in the gallery. The lowest scored SNELFI will self-destruct delete by a disrupting GIF, explosion, dissolving, morphing, expiring, or by vanishing, to reveal advertisements. These advertisements may be optionally removed in the same manner to reveal additional content or advertisements. In-network and out of network end-user contacts can check a box on the screen so that no advertisements will appear. A is still passed out. At 4:30 am her iPhone announces—"Diana! A photo of you will hit SNELFI in 3 minutes . . . what are you going to do?" A jumps out of bed. She is horrified to see the SNELFIES in B's cloud on her phone. She panics more as the clock counts down. A is unable to wake B who is out cold. She looks out the window and sees 50 paparazzi standing outside her hotel. They are all waiting to snap an early morning photo of A's face before she catches her plane to New York. In the next two minutes A must wake B to have him stop the launch of the photos, access a Photoshop tool and erase her face, or swipe her credit card to pay 99 cents to stop the launch.

Embodiment P

Amateur Music Promotion and Sharing

A is an up and coming rock band from Los Angeles which uploads its songs and music to the free SNELFI gallery for the public to view and score. A may select any number of preferred (in-network contacts) fans to be notified in advance when A's music is uploaded into the SNELFI server. A's fans will also be notified (via time clock) of the precise time and day when A's music will be disbursed from the cloud to the SNELFI music gallery for public scoring (essentially crowd sourced voting). A may also send the music to selected non-interactive foreign websites for general viewing, rating, or scoring.

A's preferred contacts are given special permissions to preview (using a time restriction), rate, score, comment, edit, or even collaborate with A's music while it is still in the server but before it reaches the SNELFI gallery.

A may choose the free version of the system which only permits A's own music (or songs) to compete for public scoring and approval, or A may upgrade to a premium account so that A's music can compete against other bands from different parts of the country to be rated by entertainment professionals and executives within the industry.

During the viewing period, end-user crowd sourced scoring of A's music files causes the displayed percentage numbers to fluctuate in the negative and positive as end-users compete by adding and subtracting (up-voting or down-voting) from scores on the music files. After a week has passed, the scores are locked in and end-users can no longer score the files. A's latest music file (a song) has a score of 98%. A's other music files display scores of 67% and 43%. A's song is the best by popular demand and remains visible in the gallery for the longest period of time with the high score of 98%.

A's lowest scored file (43%) explodes to reveal the following advertisement 1,000 free pairs of sneakers available at yourfreesnelfisneakers.com. The sneakers must be redeemed in 20 minutes (a time clock appears), or call 1-800-555-5555. When the clock expires, the advertisement is no longer redeemable.

A's next highest scored file (43%) begins to melt to reveal the following advertisement World Bank of Pluto is offering the first 17,000 customers $500.00 to open a new savings account. When the clock expires, the advertisement is no longer visible.

B is an out of network end-user who lives in a different part of the country. Although B really likes A's music, B is so irritated by seeing advertisements, that B simply checks a box on his mobile application so that no advertisements appear on his mobile or desktop display Embodiment Q Academic and Institutional Use A is studying photography at a university. Professor B assigns A as class leader to oversee 30 of his classmates. Professor B instructs the class they are to take no more than 10 photographs each of various wild animals in their natural habitat. They are instructed that they are not allowed to use a camera, but must only use their cell phones. B tells them they are not allowed to use image enhancers, filters, or Photoshop. B tells the class they will be competing with another class, and winning class members will each receive a $500.00 tuition scholarship. B gives them special instructions to download the SNELFI app. B provides the class with a special code which will allow them to sync the photos into the university's private cloud. When the class has finished downloading the app, the professor takes a group photo which is immediately uploaded into the cloud. This triggers the contest time clock which will end in 2 weeks (Jan. 14, 2018 at 12 pm). On the deadline, the unedited photos will be disbursed from the university's private cloud (or server) onto the university's SNELFI webpage gallery where they will be scored and rated by students, faculty, and alumni. A took a trip to Alaska, where on Jan. 7, 2018 he observed what was obviously a Yeti and a Bigfoot with their offspring. He snapped a photo with his iPhone and the photo was immediately uploaded into the school's SNELFI cloud.

Before A could take another photo, the reclusive beasts disappeared into the woods. On Jan. 14, 2018 at 12 pm A's photo has a locked-in approval rate of 100% and is the unofficial winner of the contest. Professor B studies the photo and immediately clicks on the photo. This caused A's name and/or photo to appear in the university's website gallery, identifying A as someone who altered the photo. B texts a private message to A asking the following:

"Did you alter this magnificent photo of the Yeti and Bigfoot?"

A replies

"Not really. I just enhanced the light so the beasts stand out more."

B replies

"Sorry. It's an awesome photograph but your team is disqualified."

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A method for facilitating limited time content sharing, the method comprising:
   receiving, by a server, original media content created by a user;
   storing the original media content on the server, wherein the server is configured to store media content, maintain profiles of a plurality of end users, and control access to said media content;
   notifying a first subset of end users of the availability of the original media content;
   delivering the original media content to one or more of the first subset of end users;
   receiving altered media content from one or more of the first subset of end users, wherein the altered media content comprises a modified version of the original media content;
   notifying a second subset of end users of the availability of the altered media content, wherein the notification is limited to end users specified by the user to receive a type of the altered media content;
   delivering the altered media content to one or more of the second subset of end users;
   receiving a score of the altered media content from at least one of the one or more of the second subset of end users, wherein the score of the altered media content is based on the end user's review of the altered media content;
   waiting a period of predetermined time;
   calculating an overall score based on the scores of the at least one of the one or more of the second subset of end users at the end of the predetermined time;
   removing access to the altered media content for the end users on the server when the overall score does not exceed a minimum score; and
   sending a message to a plurality of end user devices to execute a self-destruct algorithm when the overall score does not exceed a minimum score, wherein the self-destruct algorithm comprises:
      displaying a self-destruct media sequence to the one or more of the plurality of end users to which the altered media content was delivered at a screen location of the received media content; and
      displaying an advertisement to the one or more of the plurality of end users at the screen location of the altered media content after the self-destruct media sequence finishes.

2. The method of claim 1, wherein the original media content created by the user is created by a drone.

3. The method of claim 1, wherein the original media content comprises photographic content.

4. The method of claim 1, wherein the original media content comprises audio content.

5. The method of claim 1, wherein the original media content comprises animated filter content.

6. The method of claim 1, wherein the original media content comprises animated content.

7. The method of claim 1, wherein the advertisement comprises a discount.

8. The method of claim 1, wherein the notification to the one or more of the plurality of end users comprises a text message.

9. The method of claim 1, wherein the notification to the one or more of the plurality of end users comprises an email.

10. The method of claim 1, wherein the notification to the one or more of the plurality of end users comprises an audio notification, a visual notification, or a vibration on the end user device.

11. A system for facilitating limited time content sharing, the system comprising:
   a user device, the user device comprising a content collection subsystem and a communications subsystem, wherein the content collection subsystem is configured to create media content, and the communications subsystem is configured to transmit the media content and access data specifying a plurality of end user profiles to be granted access to the media content to a server;
   the server comprising a data store and a server communications subsystem, wherein the server communications subsystem is configured to receive the media content and place the media content in the data store, and to receive the access data from the user device, wherein the server is configured to evaluate the access data specifying the plurality of end user profiles and send a notification message, through the server communications subsystem, to a plurality of end user devices specified in the plurality of end user profiles;
   each of the plurality of end user devices comprising an end user output device connected to an end user processor, the end user processor connected to an end user input device and a device communications subsystem, the device communications subsystem configured to receive a notification message and present a notification signal using the end user output device;
   wherein the server is further configured to:
      receive original media content from a user;
      receive a request for the original media content from a first subset of the end user devices;
      retrieve the original media content from the data store;
      send the original media content to the first subset of the end user devices;
      receive altered media content from an end user device of the first subset of the end user devices;
      receive a request for the altered media content from a second subset of the end user devices;
      retrieve the altered media content from the data store;
      send the altered media content to the second subset of the end user devices;

receive a user rating message from one or more of the second subset of the end user devices, each user rating message comprising a score;

calculate an overall score based on the received scores;

send a self-destruct message to the one or more end user devices when the overall score is less than a minimum score at the end of a predetermined time; and remove access to the media content in the data store when the overall score is less than the minimum score at the end of the predetermined time;

wherein each of the end user devices is configured to execute a self-destruct algorithm when the self-destruct message is received, the self-destruct algorithm configured to place a self-destruct media sequence on the end user output device at a screen location of the altered media content followed by an advertisement at the screen location of the altered media content.

12. The system of claim 11, wherein the self-destruct algorithm is further configured to cause a display disruption.

13. The system of claim 11, wherein the user device comprises a personal computer.

14. The system of claim 11, wherein at least one of the end user devices comprises a mobile phone.

15. The system of claim 11, wherein at least one of the end user devices comprises a computer.

16. The system of claim 11, wherein the user device comprises a mobile phone.

17. The system of claim 11, wherein the advertisement comprises a discount.

18. The system of claim 11, wherein the notification signal comprises a text message.

19. The system of claim 11, wherein the notification signal comprises an email.

20. The system of claim 11, wherein the notification signal comprises an audio notification, visual notification, or vibration on the end user device.

21. The system of claim 11, wherein the notification signal comprises a display notification.

* * * * *